(12) United States Patent
Nozaki (10) Patent No.: US 8,287,676 B2
(45) Date of Patent: Oct. 16, 2012

(54) METHOD OF AND APPARATUS FOR MANUFACTURING LIQUID CRYSTAL DISPLAY DEVICE

(75) Inventor: Atsuo Nozaki, Hachioji (JP)

(73) Assignees: JSR Corporation, Tokyo (JP); Sumitomo Chemical Company, Limited, Tokyo (JP); Sumitomo Bakelite Co., Ltd., Tokyo (JP); Dai Nippon Printing Co., Ltd., Tokyo (JP); Toppan Printing Co., Ltd., Tokyo (JP); NEC Corporation, Tokyo (JP); Hitachi Chemical Co., Ltd., Tokyo (JP)

( * ) Notice: Subject to any disclaimer, the term of this patent is extended or adjusted under 35 U.S.C. 154(b) by 1002 days.

(21) Appl. No.: 11/663,143

(22) PCT Filed: Mar. 25, 2005

(86) PCT No.: PCT/JP2005/005486
§ 371 (c)(1),
(2), (4) Date: Oct. 20, 2008

(87) PCT Pub. No.: WO2006/103716
PCT Pub. Date: Oct. 5, 2006

(65) Prior Publication Data
US 2009/0053964 A1 Feb. 26, 2009

(51) Int. Cl.
*B32B 38/04* (2006.01)
(52) U.S. Cl. .......... 156/145; 156/64; 156/164; 156/264; 156/265; 156/291; 156/295; 156/308.2; 156/309.6; 156/309.9; 156/350; 156/351; 156/324; 156/378; 156/379; 156/517; 156/519; 156/522; 156/548; 156/552; 156/556; 156/555; 156/578; 156/583.1
(58) Field of Classification Search .............. 156/64, 156/145, 164, 264, 265, 272, 291, 295, 308.2, 156/309.6, 309.9, 350, 351, 324, 378, 379, 156/517, 519, 522, 548, 552, 556, 555, 578, 156/583.1
See application file for complete search history.

(56) References Cited

U.S. PATENT DOCUMENTS

| | | | | |
|---|---|---|---|---|
| 4,923,552 A | * | 5/1990 | Fukushima et al. | 156/273.7 |
| 5,238,523 A | * | 8/1993 | Yuasa et al. | 156/517 |
| 5,943,113 A | * | 8/1999 | Ichihashi | 349/187 |
| 6,136,142 A | * | 10/2000 | Kitagawa et al. | 156/555 |
| 6,414,741 B2 | * | 7/2002 | Hasegawa et al. | 349/187 |
| 2011/0284147 A1 | * | 11/2011 | Nakazono et al. | 156/64 |

* cited by examiner

*Primary Examiner* — Katarzyna Wyrozebski Lee
*Assistant Examiner* — Joshel Rivera
(74) *Attorney, Agent, or Firm* — Flynn, Thiel, Boutell & Tanis, P.C.

(57) ABSTRACT

A seal agent D and liquid crystal C are clamped to a lower substrate 6, a pair of the lower substrate 7 and an upper substrate 7 are laminated with the seal agent D and the liquid crystal C interposed therebetween, and at least one of the pair of substrates is a roll-shaped long flexible resin film. When the substrates are laminated, the lower substrate 6 on one hand is aligned to the upper substrate 7 on the other hand in every arbitrary length. With this arrangement, productivity can be improved as well as a positional dislocation due to accumulation of positioning errors can be prevented.

6 Claims, 7 Drawing Sheets

METHOD OF AND APPARATUS FOR MANUFACTURING LIQUID CRYSTAL DISPLAY DEVICE

TECHNICAL FIELD

The present invention relates to a method of and an apparatus for manufacturing a liquid crystal display device by laminating two substrates through a seal agent and a liquid crystal interposed therebetween.

BACKGROUND ART

A liquid crystal display device ordinarily has a structure composed of a pair of substrates having a liquid crystal sealed therebetween and is used by additionally disposing an illumination unit such as a backlight and the like and accessories such as a liquid crystal drive, IC and the like thereto.

There is a liquid crystal display device made in a cell assembly process, in which at least one substrate, for example, is a flexible film substrate, by applying a seal agent to at least the substrate on one hand, applying a liquid crystal to at least the substrate on one hand so that it is disposed in the frame of the substrate, and laminating both the substrates with the seal agent and the liquid crystal interposed therebetween (refer to Patent Document 1).

Patent Document 1: Japanese Patent Application Laid-Open Publication No. 2004-272087 (page 2)

DISCLOSURE OF THE INVENTION

Problems to be Solved by the Invention

As described above, when the liquid crystal display device is manufactured by laminating both the substrates with the seal agent and the liquid crystal interposed therebetween, the liquid crystal display device cannot be continuously manufactured because the substrates are composed of sheets or the device is mainly manufactured in a batch process, and thus productivity is bad.

Further, when, for example, roll-shaped long flexible substrates are laminated to each other and laminated portions are dislocated, the amount of dislocation of the laminated portions accumulates, thereby the performance of the liquid crystal display device deteriorates after it is made into a cell.

An object of the present invention, which was made in view of the above circumstances, is to provide a method of and an apparatus for manufacturing a liquid crystal display device which can improve the productivity as well as prevent accumulation of a positional dislocation.

Means for Solving the Invention

To solve the above problems, the present invention is a method of manufacturing a liquid crystal display device by clamping a seal agent and liquid crystal to one of a pair of substrates and laminating the pair of substrates with the seal agent and the liquid crystal interposed therebetween, wherein at least one of the pair of substrates is a roll-shaped, long flexible resin film, and when the substrates are laminated, a substrate on one hand is aligned and laminated to a substrate on the other hand at every arbitrary length. Productivity can be improved by continuously laminating the substrate of the roll-shaped long flexible resin film to the substrate on the other hand and, moreover, a positional dislocation due to the accumulation of positioning errors can be prevented by aligning the laminated positions at every arbitrary length.

After the substrates are laminated, only the substrate on one hand is cut off and both the substrates are repeatedly aligned again. With this operation, the positional dislocation of both substrates can be more securely prevented.

Since the substrate on one hand is a previously cut-off sheet, no sheet cutting means is required.

Since alignment is carried out by holding and fixing at least one of the substrates to a movable stage capable of correcting position, the alignment can be securely carried out.

After the alignment is carried out, a predetermined angle is formed by causing the substrate on the other hand to come into contact with the substrate of the flexible resin film and the substrates are sequentially laminated from the contact point of the substrate of the flexible resin film and the substrate on the other hand. With this operation, the substrate of the flexible resin film can be sequentially laminated to the substrate on the other hand from the contact point thereof without the mixture of bubbles.

Alignment marks for alignment are formed at the approximately central portions of a substrate at every arbitrary length to be laminated. With this operation, since the alignment is carried out referring to the alignment marks at the approximately central portions of the substrate, an alignment accuracy can be improved.

At least the substrate on one hand provided with the liquid crystal is heated. The bubbles mixed with the liquid crystal can be removed by heating the substrate, or the substrate can be easily laminated by being softened.

Further, the pair of substrates are laminated in a pressure-reduced state. Mixture of bubbles can be prevented by laminating the substrates in the pressure-reduced state.

The present invention is a method of manufacturing a liquid crystal display device by clamping a seal agent and liquid crystal to one of a pair of substrates and laminating the pair of substrates with the seal agent and the liquid crystal interposed therebetween, wherein when the substrates are laminated, liquid crystal is transferred to the substrate on one hand through a porous member. Since a predetermined amount of liquid crystal can be transferred on the substrate by a simple method, the liquid crystal display device having a high productivity can be provided at a low cost.

Further, after the liquid crystal is transferred to the substrate through the porous member, a seal agent is disposed around the liquid crystal and, after the liquid crystal is transferred to the substrate on one hand through the porous member, a seal agent is applied to a predetermined position of the substrate on the other hand so that the seal agent is disposed around the liquid crystal. With this operation, the liquid crystal can be securely held by the seal agent.

REFERENCE NUMERALS 1 lower substrate transport means
2 upper substrate transport means
3 seal agent/liquid crystal adhesion means
4 laminating means
5 lower substrate
6 upper substrate
C liquid crystal
D seal agent

BEST MODE FOR CARRYING OUT THE INVENTION

A method of and an apparatus for manufacturing a liquid crystal display device of the present invention will be explained below in detail based on the drawings. Although the embodiment of the present invention shows a most preferable mode of the invention, the invention is not limited thereto.

Figure 1:
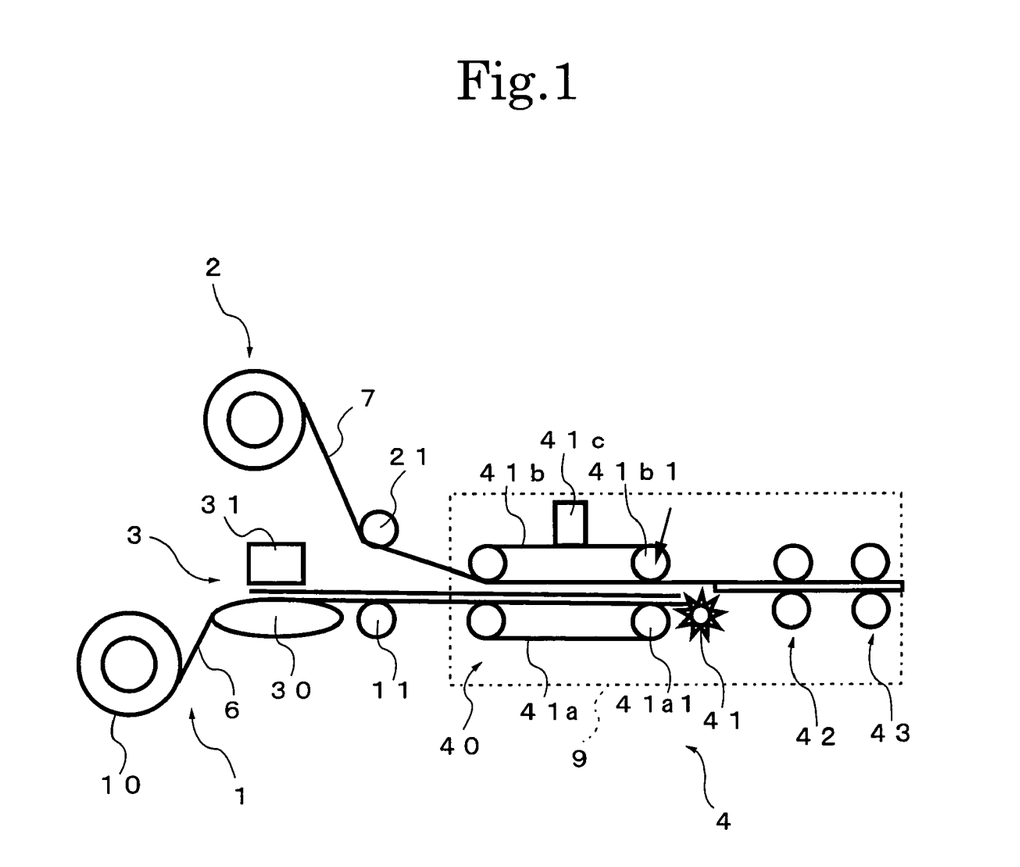
FIG. 1 is a schematic side elevational view of an apparatus for manufacturing a liquid crystal display device of the present invention.

FIG. 1 is a schematic side elevational view of the apparatus for manufacturing the liquid crystal display device of the present invention.

In the present invention, a seal agent and liquid crystal are clamped to one of a pair of substrates, and both the substrates are laminated with the seal agent and the liquid crystal interposed therebetween, and the apparatus includes a lower substrate transport means 1, an upper substrate transport means 2, a seal agent/liquid crystal adhesion means 3, and a laminating means 4.

The lower substrate transport means 1 unwinds a lower substrate 6 from an unwinder 10 through a nip roll 11. The lower substrate 6 is a substrate composed of a roll-shaped long flexible resin film. The upper substrate transport means 2 rewinds an upper substrate 7 from a rewinder 20 through a nip roll 21. The upper substrate 7 is also a substrate composed of a roll-shaped long flexible resin film.

The seal agent/liquid crystal adhesion means 3 includes a suction unit 30 and an application unit 31. The suction unit 30 is disposed under the lower substrate 6, moves the lower substrate 6 while holding it so that it can be transported without positional dislocation. The application unit 31 is disposed above the lower substrate 6, adheres a liquid crystal to the lower substrate 6, applies a seal agent to the liquid crystal, and clamps the liquid crystal.

The laminating means 4 bonds the pair of substrates with the seal agent and the liquid crystal interposed therebetween and has a positioning means 40, a half-cut unit 41, a heating unit 42, and a feed unit 43.

The positioning means 40 has a lower movable stage 41a and an upper movable stage 41b. The lower and upper movable stages 41a, 41b are arranged so as to hold and fix the substrates and can align the substrates by holding and fixing at least the substrate on one hand.

The half-cut unit 42 cuts off and separates only the lower substrate 6 as the substrate on one hand at an arbitrary position after the substrates are laminated and then repeats the alignment of both the lower and upper substrates 6, 7 again. The lower substrate 6 on one hand may be a previously cut-off sheet and, in this case, no sheet cut means is required.

Figure 2:
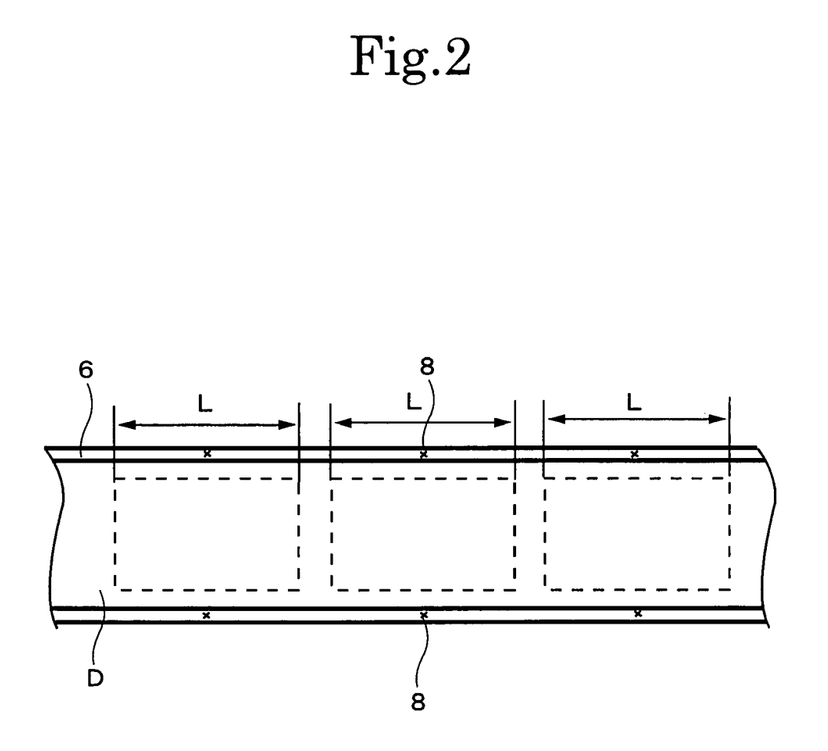
FIG. 2 is a view showing alignment marks for aligning a lower substrate.

The lower substrate 6 is provided with alignment marks 8 as shown in FIG. 2. The alignment marks 8 for alignment are formed at the approximately central portions of the substrate at every arbitrary laminating length L.

The upper movable stage 41b includes an alignment unit 41c. The alignment unit 41c detects the alignment marks 8 of the lower substrate 6 shown in FIG. 2 and makes alignment between the upper substrate 7 and the lower substrate 6 by moving the lower movable stage 41a so that the lower substrate 6 is located at a predetermined position with respect to the upper substrate 7. The alignment accuracy can be improved by making the alignment using the alignment marks 8 located at the approximately central portions of the lower substrate 5 as a reference.

The alignment between the lower and upper substrates 6, 7 may be carried out by moving the upper movable stage 41b in place of the lower movable stage 41a, and the positions thereof can be corrected by moving at least one of the stages. Since the alignment is carried out by holding and fixing at least the substrate on one hand to the movable stage capable of correcting position, the alignment can be securely carried out.

As described above, when lamination is carried out, the upper substrate 7 on one hand is aligned and laminated to the lower substrate 6 on the other hand at every arbitrary length. Productivity can be improved by continuously laminating the upper substrate 7 to the lower substrate 6. Moreover, a positional dislocation due to the accumulation of positioning errors can be prevented because the alignment is carried out at the arbitrary lengths when the substrates are laminated.

Figure 3:
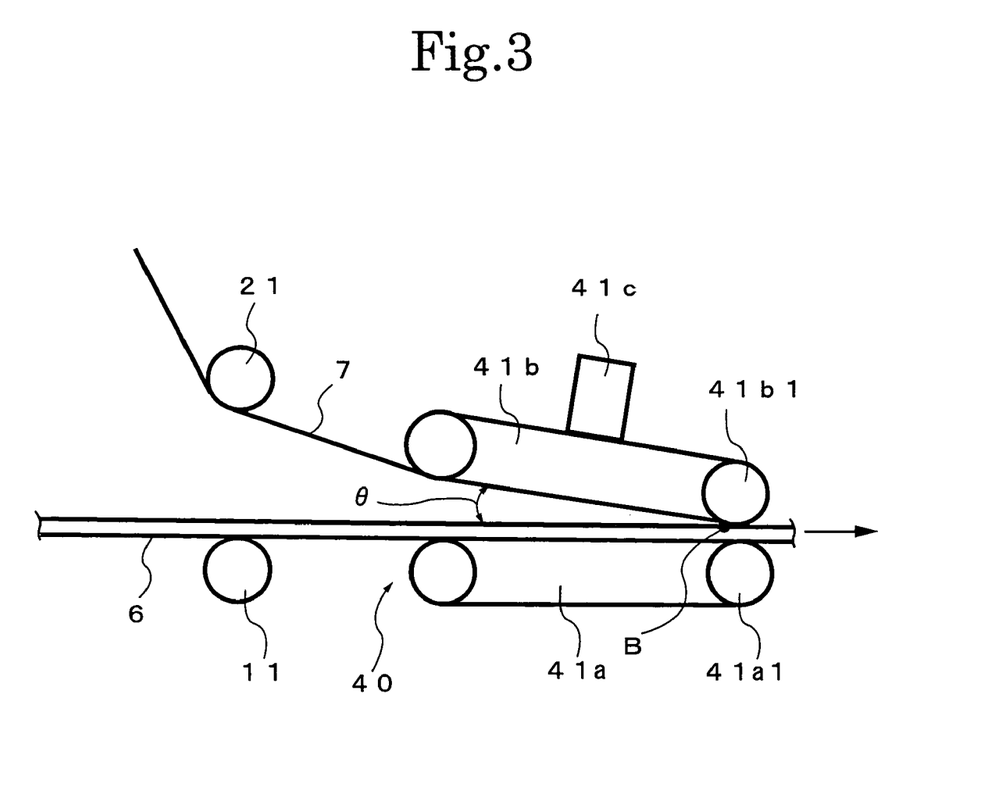
FIG. 3 is a view showing a laminated state after alignment is carried out.

After the alignment is carried out, the downstream side 41b1 of the upper movable stage 41b in the transport direction thereof is moved to the downstream side 41a1 of the lower movable stage 41a in the transport direction thereof as shown in FIG. 3. As a result, a predetermined angle θ is formed by causing the upper substrate 7 on one hand to come into contact with the lower substrate 6 on the other hand, thereby the lower and upper substrates 6, 7 are transported. The lower substrate 6 is sequentially laminated to the upper substrate 7 from the contact point B thereof by transporting them as described above. With this operation, the lower substrate 6 can be sequentially laminated to the upper substrate 7 while preventing bubbles from entering therebetween from the contact point B thereof.

Further, after the substrates are laminated, only the lower substrate 6 on one hand is cut off and separated in a width direction at the arbitrary position as shown in FIG. 1. With this operation, the positional dislocation of both the substrates can be more securely prevented.

The laminating means 4 is disposed in a vacuum chamber 9, and the substrates are laminated in a pressure-reduced state. Mixtures of bubbles can be prevented by laminating the substrates in the pressure-reduced state. Note that it is sufficient to dispose the vacuum chamber 9 at a portion where the substrates are at least aligned and laminated.

The heating unit 42 is disposed downstream of the half-cut unit 41 in the transport direction thereof and heats and laminates the lower and upper substrates 6,7. It is sufficient for the heating unit 42 to heat and laminate at least the lower substrate 6 provided with the liquid crystal. Bubbles mixed with the liquid crystal can be removed by heating, and the substrate can be easily laminated by being softened.

The feed unit 43 is composed of transport rollers and the like and transports a cell of the laminated liquid crystal display device to the next process.

Figure 4:
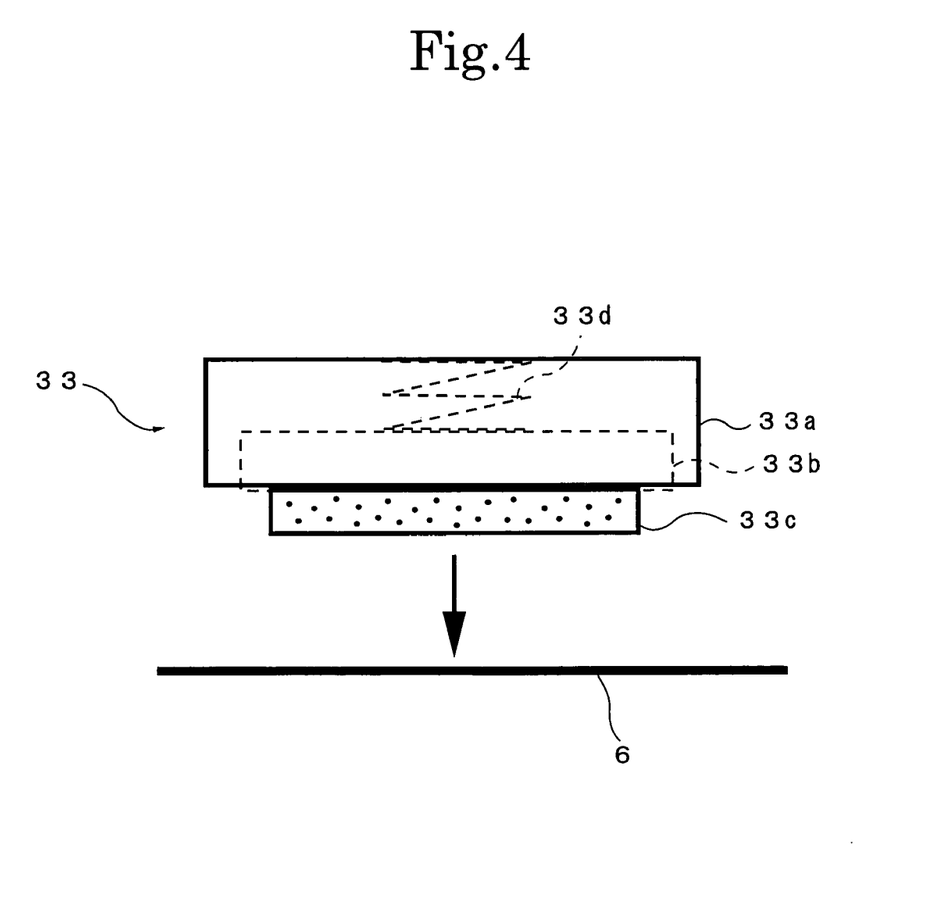
FIG. 4 is a view showing a liquid crystal adhesion means before it is used.
Figure 5:
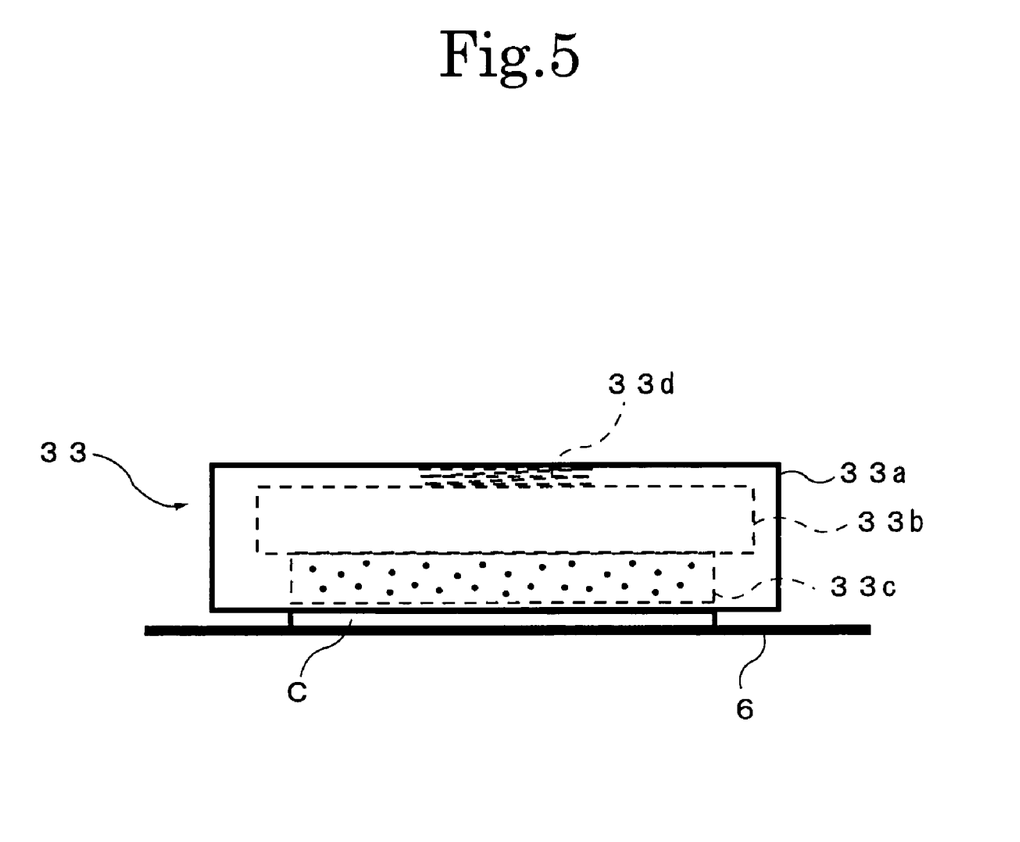
FIG. 5 is a view showing a liquid crystal adhesion means after it is used.

Next, another embodiment of the present invention will be explained based on FIGS. 4 to 7. FIG. 4 shows a liquid crystal adhesion means before it is used, and FIG. 5 shows the liquid crystal adhesion means after it is used. Further, FIG. 6 is a view showing an example of disposing a seal agent to a liquid crystal, and FIG. 7 is a view showing another example of disposing the seal agent to the liquid crystal.

In the another embodiment, the liquid crystal adhesion means 33 has such a structure that a liquid crystal storage unit 33b and a porous member 33c are contained in a box-shaped main body 33a, and the porous member 33c is exposed fran the box-shaped main body 33a by an elastic member 33d through the liquid crystal storage unit 33b as shown in FIGS. 4 and 5. Liquid crystal is stored in the liquid crystal storage unit 33b and can be supplied to a porous member 33c. Further, the porous member 33c is previously composed of a flexible member with continuous bubbles and formed like a stamp so that the liquid crystal supplied from the liquid crystal storage unit 33b comes out therefrom.

When the porous member 33c of the liquid crystal adhesion means 33 is pressed against the lower substrate 6 as shown in FIG. 4, the liquid crystal C is transferred to the lower substrate 6 through the porous member 33c as shown in FIG. 5.

Figure 6:
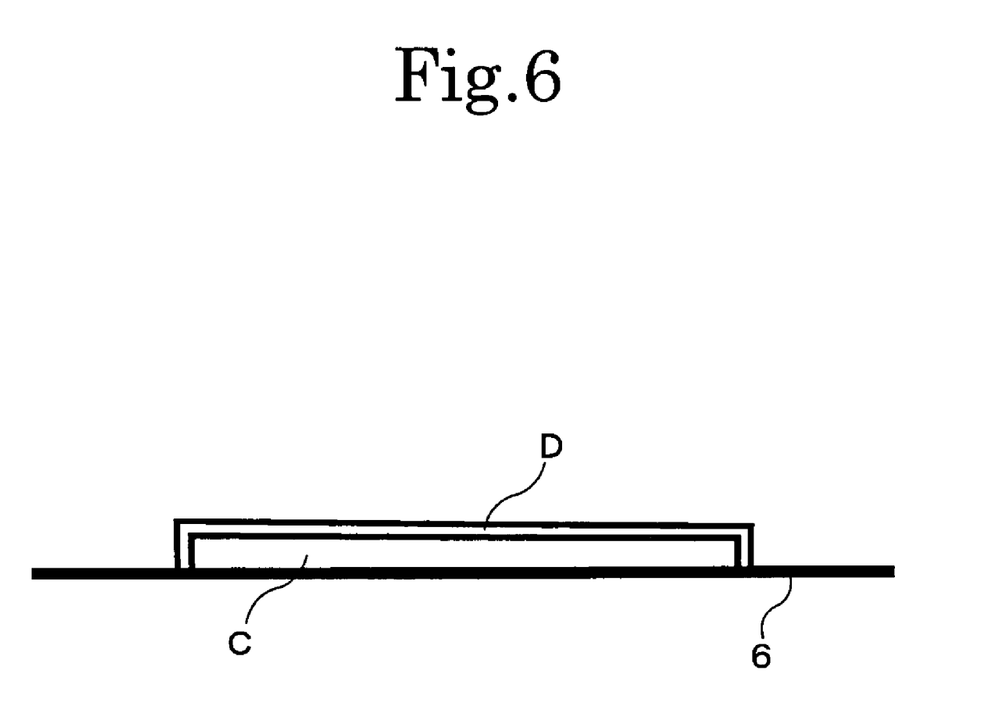
FIG. 6 is a view showing an example of disposing a seal agent to liquid crystal.
Figure 7:
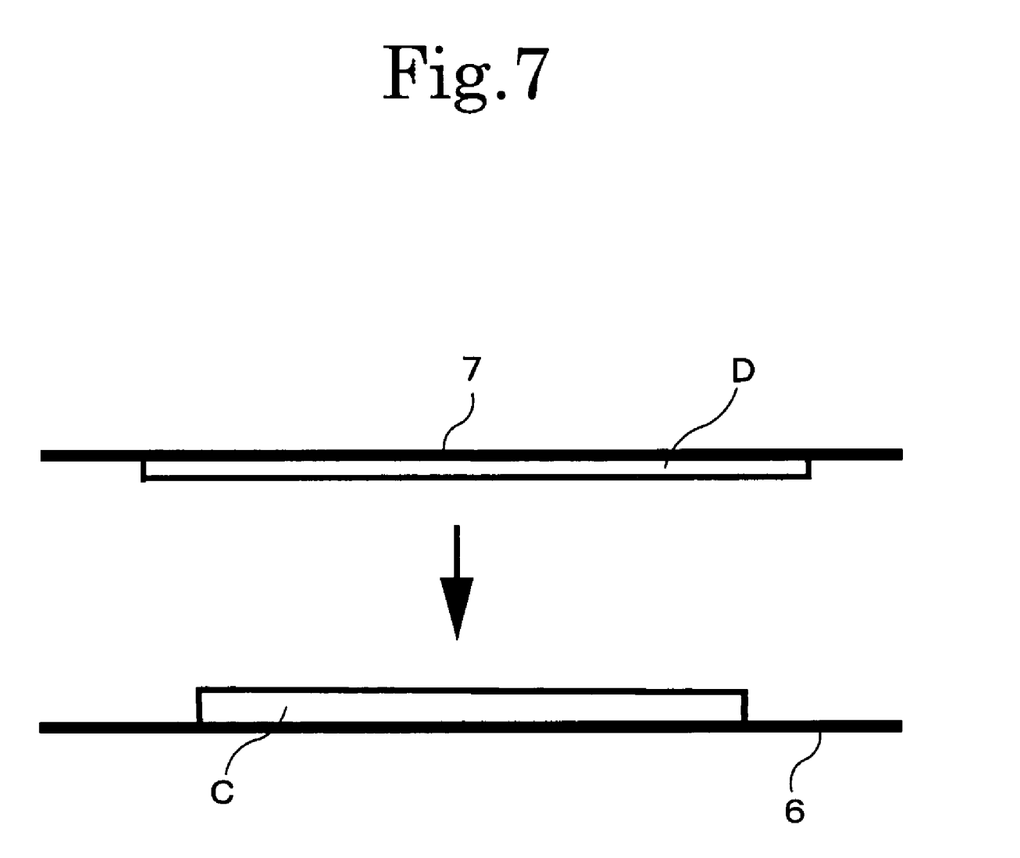
FIG. 7 is a view showing other example of disposing the liquid crystal to the seal agent.

After the liquid crystal C is transferred to the lower substrate 6 through the porous member 33c, a seal agent D is disposed around the liquid crystal as shown in FIG. 6.

Further, as shown in FIG. 7, the seal agent D is disposed at a predetermined position of the other upper substrate 7 and likewise the seal agent D disposed around the liquid crystal, thereby the seal agent D is disposed around the liquid crystal when the lower substrate is laminated to the upper substrate 7. With this arrangement, the liquid crystal C can be securely held by the seal agent D.

In the present invention, the liquid crystal C is continuously transferred to the predetermined position on the substrate on one hand through the stamp-like liquid crystal adhesion means 33 which is previously arranged to cause the liquid crystal to come out from the flexible porous member 33c, the seal agent D is applied to the above substrate or to the substrate on the other hand so that the seal agent D is disposed around the transferred liquid crystal C, and the substrates are continuously laminated to each other from the transport direction thereof under atmospheric pressure. Since a predetermined amount of the liquid crystal can be transferred to the substrate by a simple method, a liquid crystal display device having a high productivity can be provided at low cost.

INDUSTRIAL APPLICABILITY

The present invention can be used when a seal agent and a liquid crystal are clamped to one of a pair of substrates and the pair of substrates are laminated with the seal agent and the liquid crystal interposed therebetween. Since the substrates are continuously laminated while aligning one of the substrates to the other at every arbitrary length, productivity can be improved. Moreover, since the alignment is carried out at the arbitrary length when the substrates are laminated, a positional dislocation due to the accumulation of positioning errors can be prevented.

The invention claimed is:

1. A method of manufacturing a liquid crystal display device, comprising the steps of:
    providing a pair of roll-shaped, long flexible resin film substrates;
    unwinding a first one of the substrates;
    applying a liquid crystal to the first unwound substrate;
    disposing and adhering a seal agent around the liquid crystal on the first unwound substrate;
    unwinding the other one of the substrates;
    performing lamination alignment of the other substrate to the first substrate at predetermined lengths along the substrates;
    interposing the seal agent and the liquid crystal between the two substrates and laminating the substrates together; and
    cutting only the first one of the substrates at a predetermined position to produce a cell of the liquid crystal display device and
    repeating the lamination alignment of the other substrate to the first substrate.

2. A method of manufacturing a liquid crystal display device according to claim 1, characterized in that alignment is carried out by holding and fixing at least one of the substrates to a movable stage capable of correcting position.

3. A method of manufacturing a liquid crystal display device according to claim 1, characterized in that:
    after the alignment is carried out, a predetermined angle is formed by causing the other substrate to come into contact with the first substrate; and
    the substrates are sequentially laminated from the contact point of the first substrate and the other substrate.

4. A method of manufacturing a liquid crystal display device according to claim 1, characterized in that marks for alignment are formed at approximately central portions of at least one substrate at every arbitrary length to be laminated.

5. A method of manufacturing a liquid crystal display device according to claim 1, characterized in that at least the one substrate provided with the liquid crystal is heated.

6. A method of manufacturing a liquid crystal display device according to claim 1, characterized in that the pair of substrates are laminated in a pressure-reduced state.

* * * * *